United States Patent
Krueger et al.

(10) Patent No.: US 11,755,587 B2
(45) Date of Patent: Sep. 12, 2023

(54) SYSTEM FOR ANALYZING AND INTERPRETING AT LEAST ONE DATA STREAM AS WELL AS METHOD OF COMBINING DATA FRAGMENTS

(71) Applicant: Rohde & Schwarz GmbH & Co. KG, Munich (DE)

(72) Inventors: Martin Krueger, Munich (DE); Joerg Weide, Munich (DE); Jens Geier, Munich (DE); Jens Vieweger, Munich (DE); Michael Finsterbusch, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/777,015

(22) Filed: Jan. 30, 2020

(65) Prior Publication Data

US 2020/0278974 A1   Sep. 3, 2020

(30) Foreign Application Priority Data

Feb. 28, 2019   (EP) ..................................... 19160120

(51) Int. Cl.
*G06F 16/2455* (2019.01)
*G06F 16/25* (2019.01)
(52) U.S. Cl.
CPC ...... *G06F 16/24568* (2019.01); *G06F 16/254* (2019.01)

(58) Field of Classification Search
CPC . G06F 21/554; G06F 16/24568; G06F 16/254
See application file for complete search history.

(56) References Cited

U.S. PATENT DOCUMENTS

| | | | |
|---|---|---|---|
| 7,242,681 B1 | 7/2007 | Van Bokkelen et al. | |
| 2009/0171999 A1* | 7/2009 | McColl | G06F 16/2465 |
| 2011/0107273 A1* | 5/2011 | Ranganathan | G06F 9/4494 |
| | | | 718/100 |
| 2015/0293954 A1 | 10/2015 | Hsiao et al. | |
| 2016/0291847 A1* | 10/2016 | Lee | G06F 3/04847 |
| 2017/0374402 A1* | 12/2017 | Pogorelik | H04N 21/4756 |
| 2018/0124001 A1* | 5/2018 | Onusko | G06F 16/24562 |
| 2018/0343491 A1* | 11/2018 | Loheide | H04L 65/4084 |
| 2019/0108282 A1* | 4/2019 | Zeng | G06F 16/243 |

FOREIGN PATENT DOCUMENTS

EP   1772992 A1   4/2007

* cited by examiner

*Primary Examiner* — Mariela Reyes
*Assistant Examiner* — Courtney Harmon
(74) *Attorney, Agent, or Firm* — CHRISTENSEN O'CONNOR JOHNSON KINDNESS PLLC

(57) ABSTRACT

A system for analyzing and interpreting at least one data stream comprises at least two extraction modules and at least one aggregation module that is configured to receive tagged data fragments from the at least two extraction modules. The aggregation module is configured to combine the tagged data fragments received from the at least two extraction modules to one session data. Further, a method of combining data fragments is described.

12 Claims, 3 Drawing Sheets

SYSTEM FOR ANALYZING AND INTERPRETING AT LEAST ONE DATA STREAM AS WELL AS METHOD OF COMBINING DATA FRAGMENTS

FIELD OF THE DISCLOSURE

Embodiments of the present disclosure relate generally to a system for analyzing and interpreting at least one data stream. Further, embodiments of the present disclosure relate generally to a method of combining data fragments.

BACKGROUND

In current network traffic processing systems, data streams comprise several events that contain data, also called data fragments, wherein the events are processed individually and independently of each other without any linkage between the events processed. Thus, no conclusion can be drawn whether the respective data of the several events is linked with each other or not, as the data is processed individually and independently of each other.

Moreover, the systems use a data model that is decoder specific so that each decoder type requires its own data model. In fact, the values of the data, namely the decoded values, are of semantic type. Therefore, it is not possible to link data decoded by different decoder types. Put another way, a single value decoded from the data stream does not have a defined relationship to another value. Thus, only the order of the values may be of importance.

In fact, the data is streamed continuously so that certain matching information may hit a rule engine too late, which in turn requires a memory consuming aggregation within the decoder. Furthermore, the aggregation may be done in the decoder only in parts. Thus, certain information might be missed due to the limited memory capacities.

To avoid this risk, the decoder that receives and processes the data streams has to keep all information gathered until the end of the respective data flow occurred. However, this concept still requires high memory capacities that increase the overall costs of the system.

SUMMARY

Accordingly, there is a need for a simple way to analyze and interpret at least one data stream in a cost-efficient manner.

The present disclosure provides a system for analyzing and interpreting at least one data stream. In an embodiment, the system comprises at least two extraction circuits or modules and at least one aggregation circuit or module that is configured to receive tagged data fragments from the at least two extraction modules. The aggregation module is configured to combine the tagged data fragments received from the at least two extraction modules to one session data.

Further, the present disclosure provides a method of combining data fragments. In an embodiment, the method includes the following steps:

receiving, via an aggregation circuit or module, tagged data fragments from at least two extraction modules, combing, via the aggregation module, the tagged data fragments to one session data.

Accordingly, data streams, also called data flows, may be processed by different extraction modules, which ensures a higher scalability. A scalability of Tbit/s may be obtained by the system due to the different extraction modules each processing data streams, wherein the extracted data fragments are combined by the subsequent aggregation module.

An aspect provides that the aggregation module is configured to output the session data encompassing the tagged data fragments extracted and tagged by the at least two extraction modules. Hence, tagged data fragments that originate from different extraction modules are processed by the aggregation module simultaneously such that a single session data is provided by the aggregation module.

Another aspect provides that at least one decoding circuit or unit is assigned to the at least two extraction modules, wherein the at least one decoding unit is configured to decode data fragments of the data stream. The decoding unit is configured to identify and extract the single data fragments of the respective data stream processed. As two extraction modules are provided, two decoding units may be provided that process the data streams.

According to an example, the at least two extraction modules each comprise at least one decoding unit. Thus, each extraction module has its own decoding unit such that the data streams received by the different extraction modules are processed by dedicated decoding units.

According to another aspect, at least one tagging circuit or unit is assigned to the at least two extraction modules, wherein the at least one tagging unit is configured to tag the data fragments based on a unitary tagging data model. The at least one tagging unit is configured to tag single data fragments decoded previously. Hence, the identified and extracted data fragments are individually tagged by the at least one tagging unit.

In some embodiments, the at least two extraction modules each comprise at least one tagging unit. Thus, each extraction module comprises a decoding unit as well as a corresponding tagging unit such that the decoded single data fragments are tagged in each extraction module appropriately.

The at least one decoding unit and the at least one tagging unit may be connected with each other. Hence, the single data fragments decoded in the respective decoding unit are forwarded to the tagging unit directly such that the single data fragments decoded are tagged directly.

In some embodiments, the tag assigned to a single data fragment defines a relation between data fragments. The tag may correspond to a unitary tagging data model or rather a unitary tagging data structure.

An aspect provides that each of the extraction modules decodes data fragments of a data stream received. Hence, the data fragments forwarded to the aggregation module are obtained by a decoding step previously.

Another aspect provides that each of the extraction modules tags the data fragments decoded in order to obtain tagged data fragments. The tagging also takes place by the extraction modules which identify and extract data fragments that will be tagged thereinafter. Then, the respective tagged data fragments are forwarded to the aggregation module for aggregating the tagged data fragments that may relate to different data streams.

Generally, the data fragments may correspond to application data fragments in the respective data stream.

Thus, the at least one decoder unit may be configured to decode different application protocols.

The data streams may be internet protocol data streams, for instance data streams assigned to Voice over Internet Protocol (VoIP), also called IP telephony, e-mail and/or hypertext transfer protocol (http).

The extraction module may receive different data streams, wherein tagged data fragments are outputted. The tagged data fragments including the structure data are forwarded to the aggregation module for aggregating the data fragments.

The decoder unit may define the unitary tagging data model or rather the unitary tagging data structure, wherein the unitary tagging data structure is announced by the decoder unit.

The unitary tagging data model or rather the unitary tagging data structure may generally relate to contexts, data fields and relations.

The unitary tagging data model/structure may comprise context identifications (context IDs) that are globally unique. This ensures that the context IDs can be assigned in an unambiguous manner.

The decoder unit of the extraction module may stream the different data fields as they become available.

The data fields originating from the same decoder unit may have a common root context, which identifies the processing decoder unit.

Accordingly, a system may be provided that is configured to look for certain information and to spit out everything related to it in a structured way. Hence, a system may be provided that is configured to retrieve data fragments, for instance metadata, content and/or raw data, from monitored data, namely data streams, related to at least one matching rule in a structured way. In fact, the system may use a rule engine to structure the data in accordance with the at least one matching rule.

Therefore, an event based data processing model, also called context data model, may be provided that is used by the system.

Accordingly, the system for analyzing and interpreting at least one data stream may correspond to a network traffic processing system.

Generally, all aspects described above apply for the system as well as the method in a similar manner.

The extraction module(s), the aggregation module(s), the tagging unit and/or the decoding unit can comprise hardware and/or software portions or circuits, etc. Some of the methodologies and technologies set forth herein may be implemented in hardware and/or in software. In some embodiments, one or more of the method steps set forth herein may be implemented, for example, only in software. In some embodiments, all of the method steps are implemented, for example, only in software. In some embodiments, the method steps are implemented only in hardware.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
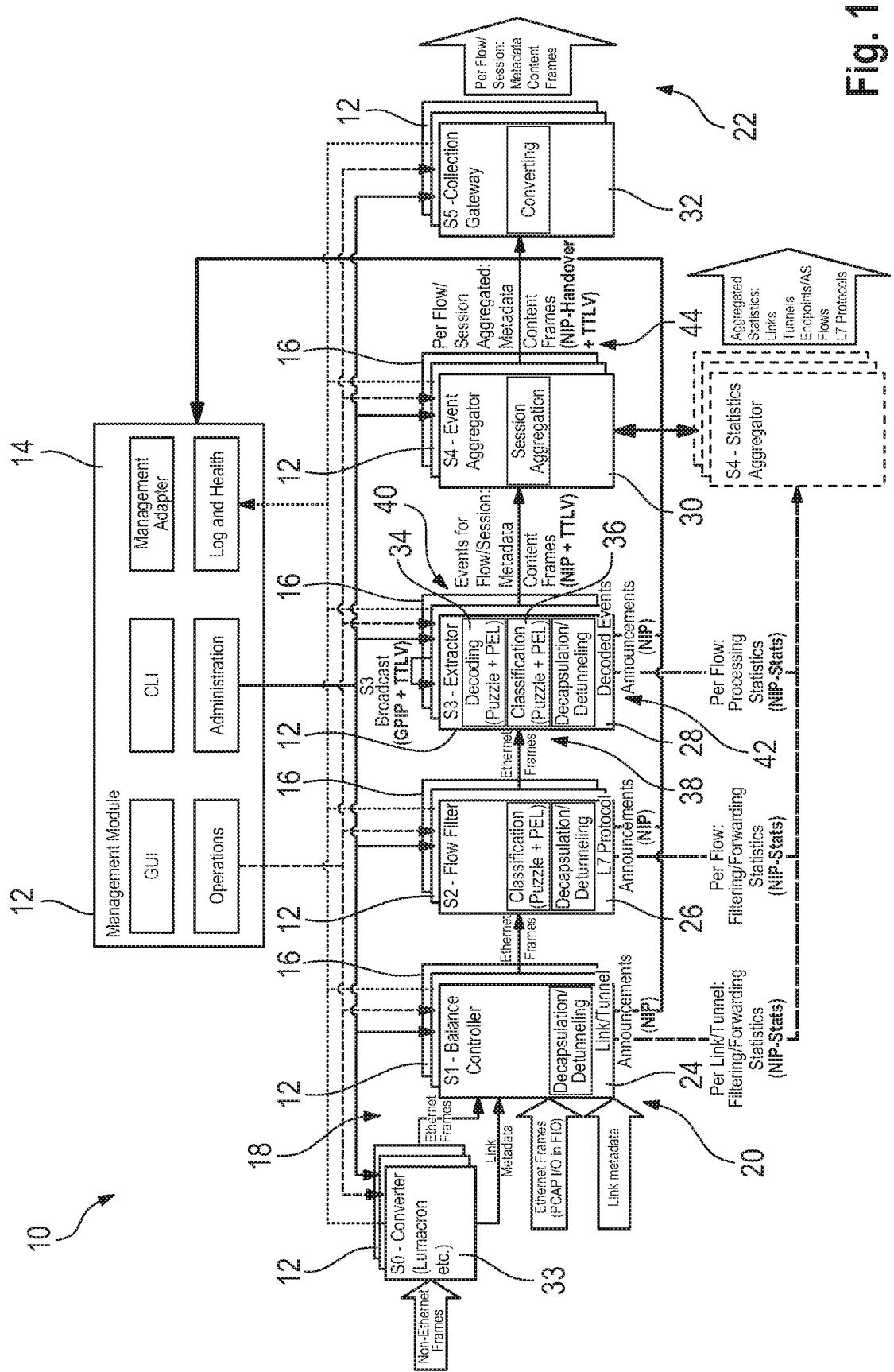
FIG. 1 schematically shows an overview of a representative system for analyzing and interpreting at least one data stream according to an embodiment of the disclosure.

FIG. 1 shows a system 10 that is configured to analyze and interpret at least one data stream, wherein the data stream processed by the system 10 comprises data, for instance metadata, raw data and/or content. The system 10 comprises a plurality of circuits or modules 12, namely a management module 14 as well as several data processing modules 16.

The data processing modules 16 are arranged in a serial module chain 18 that has an input 20 and an output 22. The input 20 of the module chain 18 is configured to receive data of the data streams, also called interception data, whereas the output 22 of the module chain 18 is configured to output structured interception data.

Therefore, the several data processing modules 16 assigned to the serial module chain 18 are configured to structure the interception data received via the input 20.

In the shown embodiment, the data processing modules 16 comprise at least one balance controller circuit or module 24, at least one flow filter circuit or module 26, at least one extraction circuit or module 28 as well as at least one aggregation circuit or module 30.

These different modules 24-30 are connected in series with each other. Hence, the at least one extraction module 28 is directly connected with the at least one aggregation module 30.

In some embodiments, each kind of module 24-30 is provided several times defining a certain processing layer S1-S4.

Moreover, at least one collection gateway circuit or module 32 as well as at least one converter circuit or module 33 may be provided that are located downstream and upstream of the serial module chain 18, respectively.

The upstream located converter module 33 may receive non-Ethernet frames that are converted into Ethernet frames and Link metadata which is inputted in the serial module chain 18 together with the Ethernet frames and the Link metadata as shown in FIG. 1.

The collection gateway module 32 receives aggregated data fragments from the aggregation module 30 as will be described later.

The at least one collection gateway module 32 as well as at least one converter module 33 may also be provided several times defining processing layers S0, S5.

Figure 2:
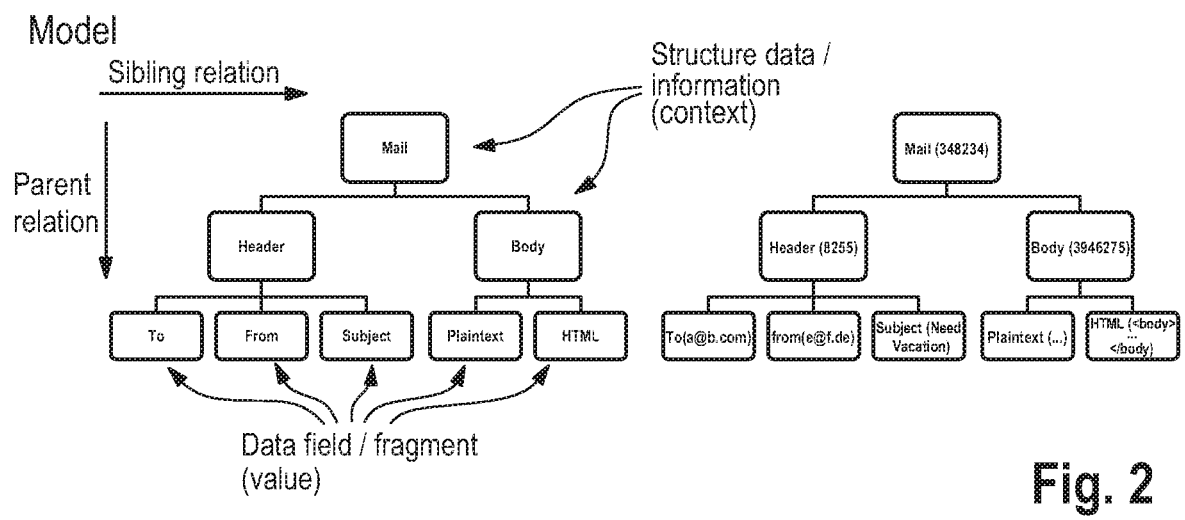
FIG. 2 schematically shows an overview of a unitary tagging data model according to an embodiment of the disclosure.

For processing the data of the data streams, the extraction module 28 has at least one decoder circuit or unit 34 as well as a tagging circuit or unit 36. The decoder unit 34 is configured to decode data fragments of the data stream received, namely the interception data. In other words, the respective decoder unit 34 identifies and extracts data fragments from the data stream processed by the extraction module 28. The tagging unit 36 of the respective extraction module 28 is configured to tag the data fragments decoded based on a unitary tagging data model, also called unitary tagging data structure, that is schematically shown in FIG. 2.

Accordingly, the extraction module 28 is configured to output extracted data fragments that were initially encompassed within the data stream. The extracted data fragments comprise a tag according to the unitary tagging data model/structure, which defines a relation between data fragments.

As shown in FIG. 1, a plurality of decoder units 34 are provided that are generally configured to process different data streams. The plurality of decoder units 34 may be assigned to dedicated extraction modules 28.

In turn, the tagging unit 36 is assigned to the plurality of decoder units 34 such that the tagging unit 36 is configured to tag data fragments of different data streams that were decoded by the plurality of decoder units 34 previously. Hence, the respective tags define a relation between data fragments originating from different data streams.

Accordingly, a single tagging unit 36 may be provided. Alternatively, one tagging unit 36 per extraction module 28 is provided.

In some embodiments, the tagging unit 36 that uses the unitary tagging data model/structure is generally configured to apply this tagging data model to the data fragments of the different data streams decoded by the plurality of decoder units 34.

In some embodiments, the unitary tagging data model may be adapted for every decoder unit 34 individually. This depends on the decoder unit 34 as well as the intended use. The tag may comprise information with regard to the respective decoder unit 34, namely a decoder identification (decoder ID).

Generally, the data fragments may correspond to application data fragments that are processed by the system 10. Thus, the at least one decoder unit 34 may be configured to decode different application protocols. Moreover, several decoder units 34 may be provided that are assigned to a certain (application) protocol.

As the extraction module 28 is located within the module chain 18, the extraction module 28 has its own input 38 as well as its own output 40.

The extraction module 28 receives via its input 38 different data streams, for example Ethernet frames, that are processed by the extraction module 28 as described above, namely by using the at least one decoder unit 34 as well as the tagging unit 36. Thus, the extraction module 28 outputs via its output 40 tagged data fragments for further processing, for example metadata, content and frames.

As described above, the extraction module 28 is directly connected with the aggregation module 30. Thus, the aggregation module 30 receives the tagged data fragments from the extraction module 28 for aggregation purposes.

Figure 3:
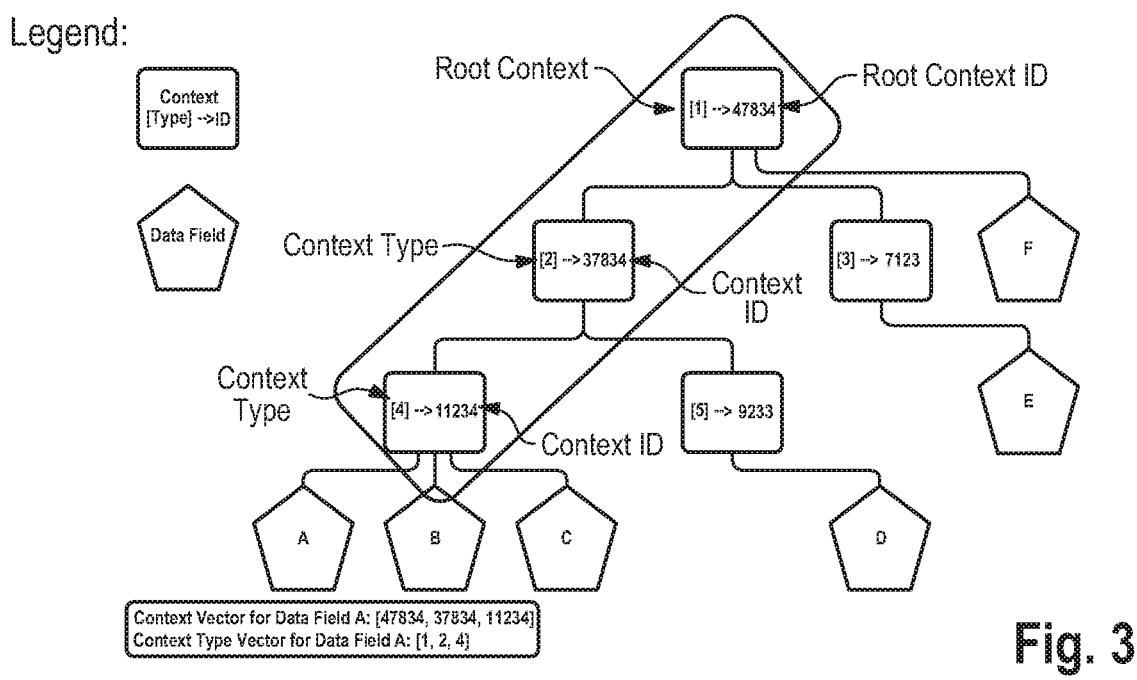
FIG. 3 schematically shows another overview of the unitary tagging data model shown in FIG. 2.
Figure 4:
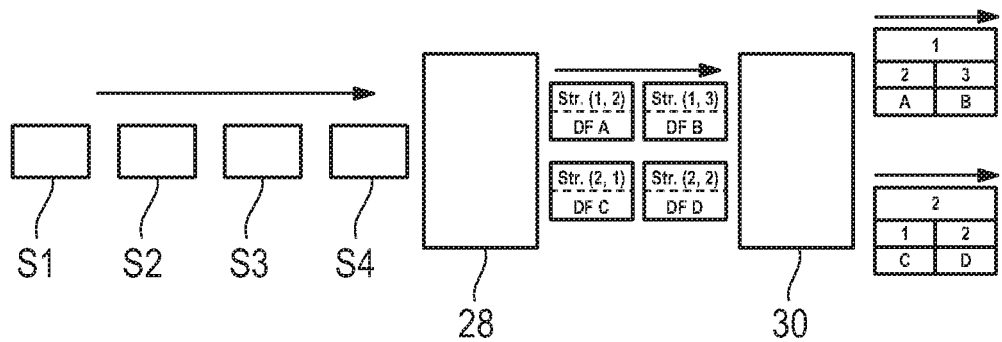
FIG. 4 schematically shows data processing by the extraction module and the aggregation module of the system shown in FIG. 1.

Since the extraction module 28 applies the unitary tagging data model on the data fragments, at least one single data fragment ("DF") is outputted that includes structure data ("Str."), as indicated in FIG. 4, for instance. The structure data ("Str.") may be assigned to the unitary tagging data model/structure applied, which is shown in FIGS. 2 and 3 for an example concerning e-mail data.

In general, the extraction module 28 is configured to output a plurality of single data fragments ("DF") each including structure data ("Str."), wherein relationships between the single data fragments are defined by the corresponding structure data.

As shown in FIG. 2, the tagging data model/structure provides different types of relations, namely sibling relation as well as parent relation. The sibling relation may correspond to different information that relates to an e-mail header such as addressee ("to"), sender ("from") and/or subject. The parent relation may correspond to the relation of data fragments with regard to the hierarchy such as "Addressee ("to")—Header—Mail", "Sender ("from")—Header—Mail" and/or "Subject—Header—Mail". Each of the above mentioned data fragments are assigned to values that may be of semantic type (addressee ("to"), sender ("from") and/or subject) and/or data type (string, number, Boolean and so on).

The unitary tagging data model/structure applied provides a structure that may put values assigned to data fields or rather data fragments in relation to each other, wherein the structure data/information corresponds to the above-mentioned context.

For instance, the unitary tagging data model/structure used comprises a unique identifier for a specific context identification (ID) and a type of context that defines how to interpret a data fragment associated with it, as shown in FIGS. 2 and 3.

In the shown example of FIG. 2, the unitary tagging data model/structure is shown for e-mail data that comprises context (structure data) which relates to the mail, the header as well as the body, whereas the data fragments are assigned to data fields associated with the header or rather the body.

FIG. 3 shows that the respective structure of the data fragments can be described by vectors, namely context vector or rather context type vectors.

In the shown example of FIG. 3, the data fragment/field with value "A" is described by the context vector [47834, 37834, 11234] as well as the context type vector [1, 2, 4].

Therefore, each single data fragment has a corresponding structure data (context) wherein the structure data may be defined by the respective vectors.

As shown in FIGS. 2 and 3, the structure data corresponds to a data tree format or a data graph.

The unitary format used may be identical for different data streams processed by the system 10.

The extraction module 28 that processes several data streams may output several data fragments with at least partially identical structure data within one message that is forwarded to the aggregation module 30.

As shown in FIG. 3, the data fragments assigned to the values "A", "B", "C" may have partially identical structure data as they are assigned to the same context vector [47834, 37834, 11234], as well as the same context type vector [1, 2, 4], as the respective data fragments relate to header information, namely the same context.

FIG. 3 also reveals that a root context as well as a root context ID are provided, which refer to the first element of the respective vector. For example, this indicates the respective instance.

The data fragments may be outputted by the extraction module 28 continuously such that the tagged data fragments are directly forwarded or rather streamed without any buffering.

Furthermore, a rule circuit or engine 42 may be provided, for example integrated in the extraction module 28.

The rule engine 42 forwards the (extracted) data fragments including the structure data to the aggregation module 30 for further processing if certain criteria will be fulfilled.

In some embodiments, the rule engine 42 is configured to forward the data fragments including the structure data and input data stream, namely the raw data, to the aggregation module 30 for further processing if certain criteria will be fulfilled.

The aggregation module 30 is configured to receive the outputted data fragments from the extraction module 28, namely the data fragments including the structure data as described above.

For further processing, the aggregation module 30 is configured to aggregate the data fragments received according to one predefined structure data for different protocols, data streams and/or decoder units 34 that are assigned to the at least one extraction module 28.

This concept is schematically shown in FIG. 4 wherein four different data packages S1 to S4 are received by the extraction module 28 and processed appropriately such that data fragments ("DF") including structure data ("Str.") are outputted by the extraction module 28 in an already structured manner.

The data fragments ("DF") including structure data ("Str.") are forwarded to the aggregation module 30 for aggregation. The aggregation module 30 is configured to aggregate the data fragments ("DF") including structure data ("Str.") according to one predefined structure data as shown in FIG. 4. Hence, the structure data ("Str.") of the data fragments ("DF") influence the aggregation done by the aggregation module 30.

The predefined structure data may relate to different protocols, data streams and/or decoder units 34 assigned to the at least one extraction module 28.

The aggregation module 30 comprises at least one output 44 via which the aggregated data fragments, namely the data fragments including structure data processed by the aggregation module 30, are outputted as shown in FIGS. 1 and 4. Hence, aggregated metadata, content and/or frames are outputted.

Generally, the aggregation module 30 may have several outputs such that different aggregated data fragments may be outputted via the outputs 44 wherein the output data comprise at least in parts identical data.

The aggregated data fragments are typically outputted together with corresponding raw data from the respective data stream inputted in the extraction module 28. Hence, the data of the data streams is outputted by the aggregation module 30, namely the respective data fields ("DF") or rather their values as shown in FIG. 4.

In general, the aggregation module 30 may convert the data fragments received into a different (application) protocol with respect to the receiving (application) protocol. This may simplify further processing of the aggregated data fragments, for instance by the collection gateway module 32.

The receiving protocol used for communication between the extraction module 28 and the aggregation module 30 may generally be compatible to at least two different types of decoder units 34.

Thus, at least two different types of decoder units 34 may be used for processing different data streams wherein the decoded data fragments are forwarded to the aggregation module 30.

Hence, the aggregation module 30 is configured to receive the tagged data fragments from at least two different types of decoder units 34 that may be assigned to at least two different extraction modules 28.

Accordingly, the tagged data fragments may relate to the unitary data model/structure even though they were identified and extracted by different extraction modules 28, for example different types of decoder units 34.

Hence, the different data streams may be processed by different extraction modules 28, wherein the aggregation module 30 is configured to combine the tagged data fragments received from the different extraction modules 28 to one single session data that is outputted.

The aggregation module 30 is configured to output the single session data that encompasses the tagged data fragments extracted and tagged by the at least two different extraction modules 28.

In general, each extraction module 28 processes the data streams in a manner as described above, wherein the unitary data model/structure is applied that might be adapted with regard to the decoder identification (decoder ID) as already mentioned, which identifies the respective decoder unit 34 in a unique manner.

Anyway, multi data flows, namely different data streams, that relate to different (application) protocols can be processed by the different extraction modules 28 or rather the decoder units 34, which ensures a higher scalability since the information gathered, namely the data, is distributed among the extraction modules 28 or rather the decoder units 34. The scalability can be improved up to Tbit/s.

For instance, Sessions Initiation Protocol (SIP) data packets, namely a first data stream, may arrive which are processed by the at least one extraction module 28. Respective correlation information concerning the data stream arrived may be broadcasted among different extraction modules 28, namely within the processing layer S3.

For this purpose, the respective decoder units 34 of the at least one extraction module 28 may share relevant correlation information, for instance via broadcast mechanism.

Then, Real-Time Transport Protocol (RTP) data packets, namely a second data stream, may arrive that are also processed by the at least one extraction module 28, namely within the processing layer S3.

The rule engine 42 may relate to forwarding context if RTP data packets and SIP data packets arrive.

If the rule provided by the rule engine 42, namely the respective criteria, is fulfilled, at least the context is forwarded to the subsequent aggregation module 30, namely processing layer S4.

Irrespective of the number of decoder units 34 or rather extraction modules 28, the aggregation module 30 is configured to aggregate the data fragments received for a predefined time.

Figure 5:
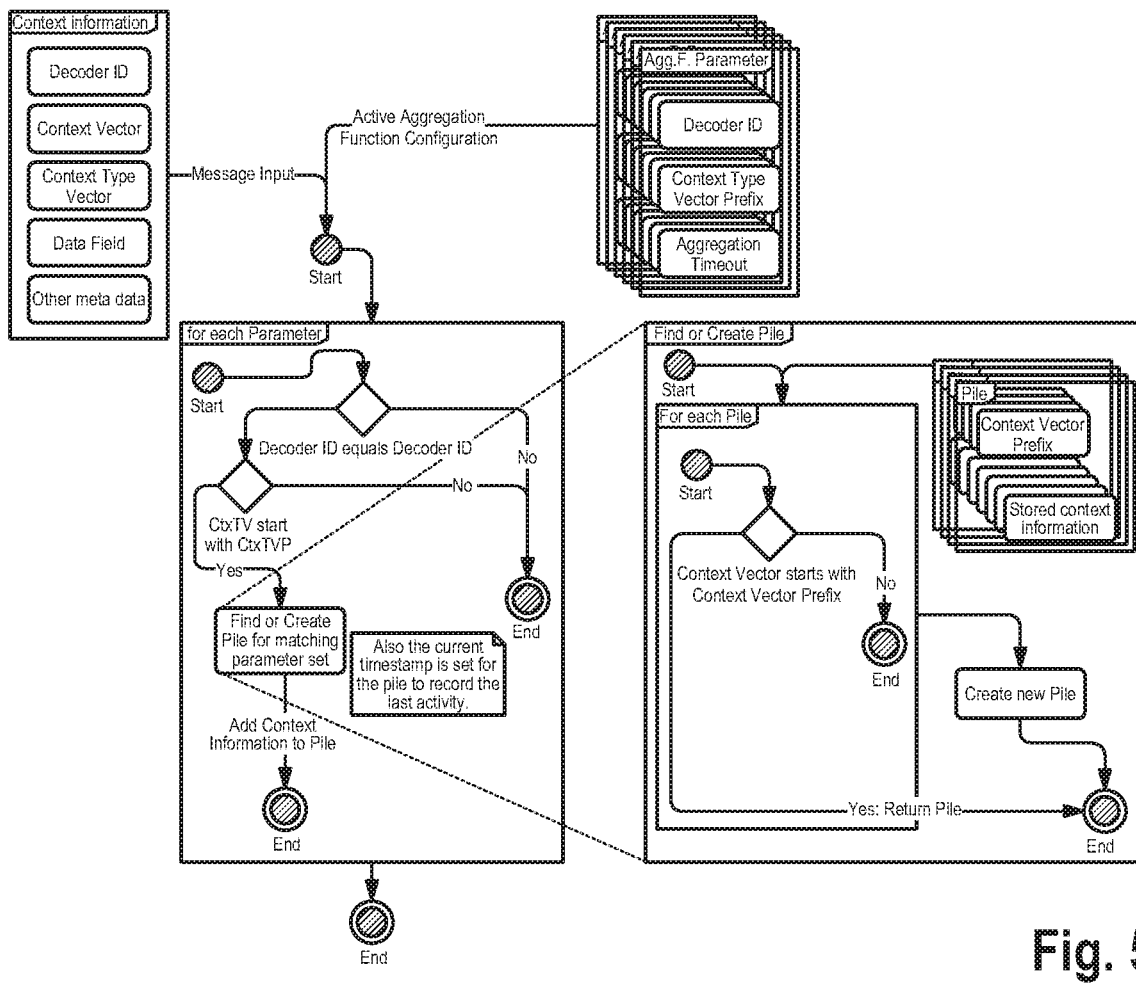
FIG. 5 schematically shows data processing by the aggregation module in more detail.

FIG. 5 shows that the data fragments including the structure data are assigned to context information which groups all information together. For instance, the context information encompasses the decoder identification (decoder ID), the context vector, the context type vector, the data field type, the data field value as well as the rule ID and the mandate ID, which trigger the forwarding of the data field from the extraction module 28 to the aggregation module 30. As already mentioned above, the context vector as well as the context type vector relate to the structure data that provides relative information with regard to the respective data fragment.

The aggregation module 30 is configured to apply an aggregation function on the context information, wherein the aggregation function comprises aggregation function parameters as illustrated in FIG. 5.

As shown, the aggregation function parameters relate to the decoder identification (decoder ID), the context type vector prefix as well as the aggregation timeout relating to the predefined time. Hence, the aggregation function parameters relate to a tuple of values as indicated above.

The aggregation module 30 is configured to create at least one pile for a matching parameter set while processing the aggregation function as well as the context information.

In other words, the matching condition of the aggregation function is assigned to the decoder ID and the context type vector prefix (CtxTVP) being part of the context type vector (CtxTV).

Thus, parameters are assigned to a single pile that have matching parameters, for example matching decoder identification and context type vector prefix.

As also shown in FIG. 5, the respective pile comprises at least one data field with common context vector prefix. Moreover, secondary data like rule ID and/or mandate ID may be assigned to the respective pile.

Thus, the aggregation module 30 is configured to output aggregated data fragments that are structured, namely by piles that relate to the respective structure data such as context type vector and context vector.

Figure 6:
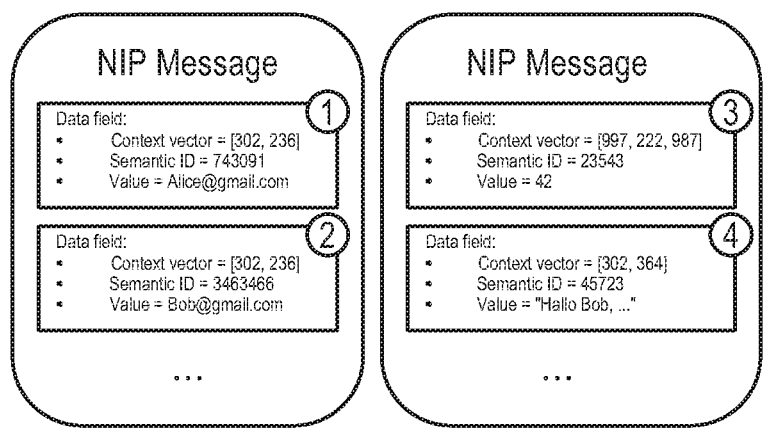
FIG. 6 schematically shows an aggregation example.
Figure 6:
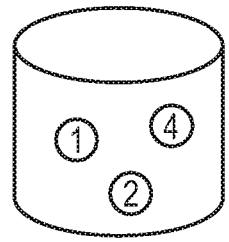

FIG. 6 shows an example for aggregation wherein a decoder type corresponds to a "Mail-Decoder", the context type vector prefix is equal to "Mail" and the aggregation timeout corresponds to "30 seconds".

As shown, the data fields assigned to "1", "2" and "4" are aggregated, as the data field indicated with "3" has a different context vector prefix.

According to another example (not shown), the context type vector prefix may be equal to "Mail—Header". Then, the data fields assigned to "1" and "2" would only be aggregated, as the context vector of data field labelled with "4" is assigned to the context vector [302, 364] corresponding to the context type vector prefix "Mail—Body".

Apart from the data processing modules 16 and their functionality described in detail above, the system 10 comprises the management module 14.

The serial module chain 18 processes the data only in direction from its input 20 to its output 22.

Each of the data processing modules 16 in the serial module chain 18 provides capability information that is used in data flow direction for configuring the following data processing modules 16. In other words, each of the data processing modules 16 announces information with regard to its own capability. The respective information is forwarded/distributed in data flow direction such that subsequent data processing modules 16 obtain the respective information.

Each data processing module 16 that receives the respective capability information of one of the previous data processing modules 16 is configured to adjust its own capability based on the capability information received from the previous one.

Generally, the respective capability information may relate to semantic information and/or processing information.

In some embodiments, replacing one of the several data processing modules 16 within the serial module chain 18 does not require to reconfigure the whole system 10 manually since the respective capability information of the new several data processing module(s) 16 is distributed to the subsequent data processing modules 16 effectively.

Hence, an automatic reconfiguration of the system 10 is achieved, as the system 10 is modular.

This means that the data processing modules 16 can be interchanged or rather replaced without the need for manual reconfiguration, as the reconfiguration of the system 10 is automatically done by the data processing modules 16 themselves announcing their respective capability information.

The respective capability information announced is received by the subsequent data processing modules 16 that adapt their settings appropriately with regard to the capability information announced such that a reconfiguration of the whole system 10 takes place.

As the management module 14 is connected to the serial module chain 18, for example each of the several data processing modules 16, the management module 14 also receives the respective capability information of each data processing module 16.

The management module 14 has a graphical user interface (GUI), wherein the management module 14 is enabled to adjust the respective graphical user interface based on the capability information received from the data processing module(s) 16.

Accordingly, the user interface is adapted to the current capability of the whole system 10.

Furthermore, the management module 14 may receive log and health information from the several data processing module(s) 16 that may be processed by the management module 14.

In addition, the management module 14 controls the several data processing module(s) 16 based on the log and health information and/or the capability information received from the data processing module(s) 16.

Generally, all aspects described above apply for the system 10 as well as the method in a similar manner.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A system for analyzing and interpreting at least one data stream, the system comprising at least two extraction circuits and at least one aggregation circuit, wherein the at least two extraction circuits comprise at least one computer hardware or at least one memory, wherein the at least two extraction circuits are configured to process at least two different data streams received via respective inputs, wherein at least one decoding circuit is assigned to the at least two extraction circuits, the at least one decoding circuit being configured to decode data fragments of the data stream, wherein at least one tagging circuit is assigned to the at least two extraction circuits, the at least one tagging circuit being configured to tag the decoded data fragments of the different data streams based on a unitary tagging data model, thereby providing tagged data fragments, wherein the extracted data fragments comprise a tag according to the unitary tagging data model, wherein the tag according to the unitary tagging data model defines a relation between the data fragments originating from the different data streams, wherein the at least one aggregation circuit is connected with the at least two extraction circuits, and wherein the at least one aggregation circuit is configured to receive the tagged data fragments from the at least two extraction circuits, and the aggregation circuit being configured to combine the tagged data fragments received from the at least two extraction circuits to one single session data that encompasses the tagged data fragments extracted and tagged by the at least two different extraction circuits such that a high scalability is ensured since the data gathered by the at least two different data streams is distributed among the at least two different extraction modules for processing the at least two different data streams and afterwards combined by the aggregation circuit.

2. The system according to claim 1, wherein the at least two electronic extraction circuits each comprise at least one decoding circuit.

3. The system according to claim 1, wherein the at least two electronic extraction circuits each comprise at least one tagging circuit.

4. The system according to claim 1, wherein the at least one electronic decoding circuit and the at least one electronic tagging circuit are connected with each other.

5. The system according to claim 1, wherein a tag assigned to a single data fragment defines a relation between data fragments.

6. The system according to claim 1, wherein at least two of the electronic circuits are portions of a processor or a microprocessor.

7. A method of combining data fragments, comprising:
decoding different data streams received by different extraction circuits, wherein the different extraction circuits comprise at least one computer hardware or at least one memory, thereby providing single data fragments decoded,
tagging the single data fragments decoded previously, thereby providing tagged data fragments, wherein the extracted data fragments comprise a tag according to the unitary tagging data model, wherein the tag according to the unitary tagging data model defines a relation between the data fragments originating from the different data streams,
receiving, via an aggregation circuit, the tagged data fragments from the at least two extraction circuits, and
combining, via the aggregation circuit, the tagged data fragments to one session data,
wherein a scalability of Tbit/s is obtained due to the different extraction circuits and the aggregation circuit that combines the tagged data fragments received from the at least two extraction circuits to one session data.

8. The method according to claim 7, wherein each of the extraction circuits decodes data fragments of a data stream received.

9. The method according to claim 8, wherein each of the extraction circuits tags the data fragments decoded in order to obtain tagged data fragments.

10. The method according to claim 7, wherein at least two of the circuits are portions of a processor or a microprocessor.

11. A system for analyzing and interpreting at least one data stream, the system comprising at least two extraction circuits and at least one aggregation circuit, wherein the at least two extraction circuits comprise at least one computer hardware or at least one memory, wherein each of the at least two extraction circuits comprises a decoding circuit as well as a corresponding tagging circuit, wherein the respective decoding circuit is configured to identify and extract single data fragments of a data stream processed by the corresponding extraction circuit, and wherein the respective tagging circuit is configured to tag the single data fragments extracted, thereby providing tagged data fragments, wherein the extracted data fragments comprise a tag according to the unitary tagging data model, wherein the tag according to the unitary tagging data model defines a relation between the data fragments originating from the different data streams, wherein the at least one aggregation circuit is configured to receive the tagged data fragments from the at least two extraction circuits processing the different data streams, and the aggregation circuit being configured to combine the tagged data fragments received from the at least two extraction circuits to one session data, wherein a scalability of Tbit/s is obtained by the system due to the different extraction circuits and the aggregation circuit that combines the tagged data fragments received from the at least two extraction circuits to one session data.

12. The system according to claim 11, wherein at least two of the electronic circuits are portions of a processor or a microprocessor.

* * * * *